No. 616,911. Patented Jan. 3, 1899.
Z. T. FURBISH.
MECHANICAL MOVEMENT.
(Application filed Apr. 17, 1897.)
(No Model.)
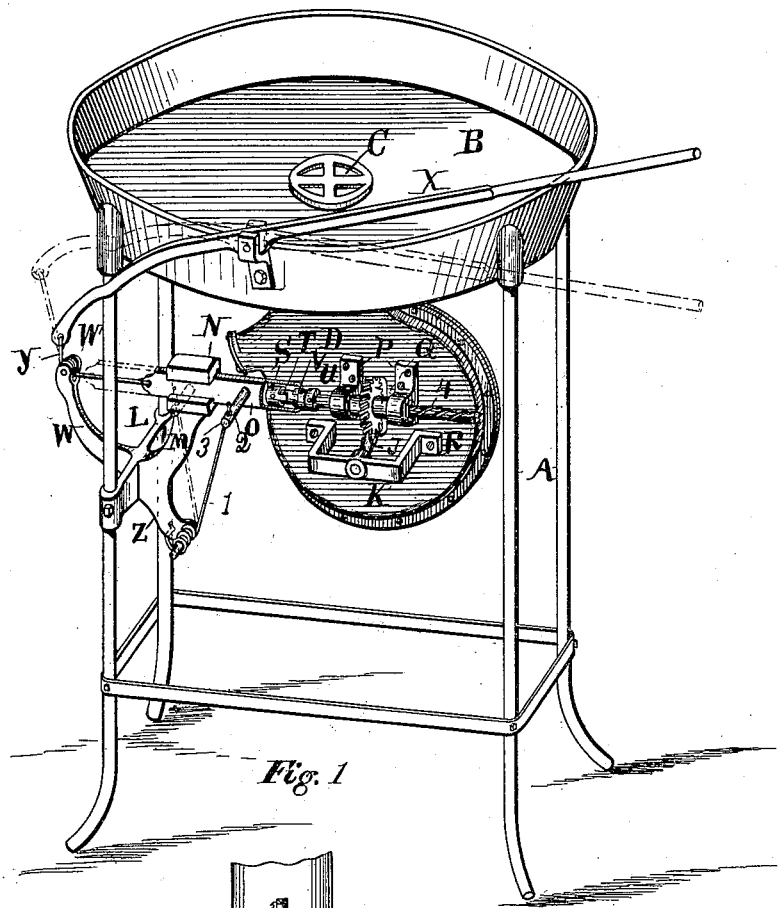
Fig. 1
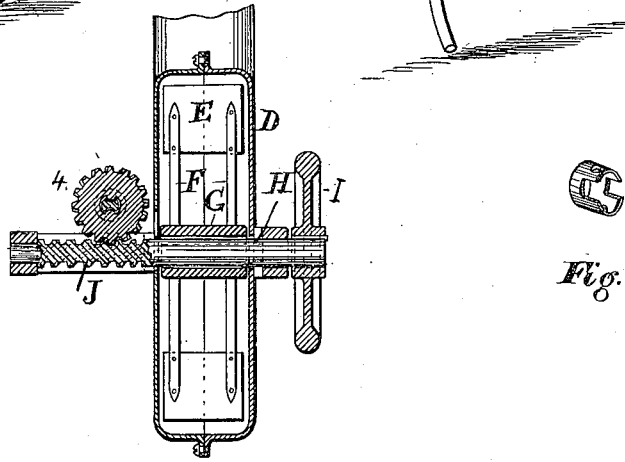
Fig. 2
Fig. 3
Witnesses:
Marion Richards.
Walter T. Camp.
Inventor.
Zachry T. Furbish,
by Verrill & Clifford,
his Attorneys.

UNITED STATES PATENT OFFICE.

ZACHRY T. FURBISH, OF PORTLAND, MAINE, ASSIGNOR TO WILLIAM H. STEVENS, OF SAME PLACE.

MECHANICAL MOVEMENT.

SPECIFICATION forming part of Letters Patent No. 616,911, dated January 3, 1899.

Application filed April 17, 1897. Serial No. 632,609. (No model.)

*To all whom it may concern:*

Be it known that I, ZACHRY T. FURBISH, a citizen of the United States of America, residing at Portland, in the county of Cumberland and State of Maine, have invented certain new and useful Improvements in Mechanical Movements; and I do hereby declare the following to be a full, clear, and exact description of the invention, such as will enable others skilled in the art to which it appertains to make and use the same.

My invention relates to improvements in mechanism for operating blowers and similar devices.

In the drawings herewith accompanying and making a part of this application, Figure 1 is a perspective view of my improved device as applied to a blower; and Fig. 2 is a transverse sectional view, on a vertical plane, through the worm and gear.

Same letters and numerals of reference refer to like parts.

In said drawings, A represents a frame; B, a pan with holes C in the bottom thereof; D, the blower-case, and E the fans, supported on arms F, secured to a hub G inside of the blower-case. A shaft H carries a balance-wheel I and has a worm-gear J on the opposite end, said shaft being mounted in suitable brackets K. Secured to the frame is a bracket L, having an arm M, terminating in a head having grooved ways N therein. Adapted to reciprocate in said ways is a sliding bar O. Mounted in brackets P is a revoluble nut Q, interiorly threaded, as seen in dotted lines in Fig. 2. Passing through said nut is a spirally-grooved spindle R. The thread on the nut is adapted to correspond with and engage the thread on the spindle. The spindle terminates in a clutch member S, secured to the end thereof and provided with projections T. On the body of the spindle is a slidable clutch member U, having indents V therein, adapted to engage with the projections on the other member. The slidable member is rigidly secured to the reciprocating slide before mentioned. Mounted in arm W of the bracket is a pulley W', and pivotally secured to the frame or in some convenient place is a lever-arm X, connected to said slide by a flexible link Y, adapted to travel over said pulley, and secured to the arm Z of said bracket is a spring 1, passing loosely up through a slot 2 in a lug 3 secured to the slide, said spring tending constantly to press said slide so as to cause the members of the clutch to engage. Secured to the nut on the reciprocating spindle is a gear 4, adapted to mesh with the worm J on the shaft which operates the fans.

The operation of my improved device is as follows: When the lever-arm is pushed down from the position shown in Fig. 1 to that shown in dotted lines in Fig. 1, it throws the slide which causes the clutch members to engage and lock spindle R against rotation, and thus as it passes through the nut it causes the nut to rotate in its bearings. In consequence thereof the gear rotates the worm-shaft on which the fans are mounted. As soon as the lever is lifted the spring tends to throw the slide back into the position shown in Fig. 1, disengaging the clutch members. The momentum of the balance-wheel continues the forward motion of the fans until the power is again applied on the lever or for a considerable time.

Having thus described my invention and its use, I claim—

1. In combination, a revoluble nut mounted in suitable brackets, a spirally-grooved spindle adapted to operate therein, a gear on said nut, a worm-gear meshing with said first-named gear and carrying a balance-wheel, and mechanism for reciprocating said spindle, said mechanism being adapted to have an alternating rigid and swivel connection with said spindle, substantially as and for the purposes set forth.

2. In combination, a suitable frame, a bracket mounted therein, a reciprocating slide mounted in the bracket, a revoluble nut mounted in suitable bearings, a spirally-grooved spindle mounted in said nut, a clutch mechanism consisting of a member secured to the end of said spindle and a slidable member mounted upon said spindle and rigidly secured to the end of the slide, means for operating said slide, a gear on the nut and a worm meshing therewith, substantially as and for the purposes set forth.

In testimony whereof I affix my signature, in presence of two witnesses, this 3d day of April, 1897.

ZACHRY T. FURBISH.

Witnesses:
ELGIN C. VERRILL,
NATHAN CLIFFORD.